United States Patent
Lagaly et al.

(10) Patent No.: US 6,810,589 B2
(45) Date of Patent: Nov. 2, 2004

(54) BEARING STRUCTURE FOR A RECIPROCATING SHAFT IN A RECIPROCATING SAW

(75) Inventors: Michael Anthony Lagaly, Jackson, TN (US); Thomas Arnold Mooty, Jackson, TN (US); James Pierce Nichols, Jr., Jackson, TN (US); Earl Roger Clowers, Anderson, SC (US); Matthew George Popik, Huntersville, NC (US)

(73) Assignee: Porter-Cable/Delta, Jackson, TN (US)

( * ) Notice: Subject to any disclaimer, the term of this patent is extended or adjusted under 35 U.S.C. 154(b) by 0 days.

(21) Appl. No.: 10/364,472

(22) Filed: Feb. 12, 2003

(65) Prior Publication Data

US 2003/0140507 A1 Jul. 31, 2003

Related U.S. Application Data

(60) Division of application No. 09/627,780, filed on Jul. 28, 2000, now Pat. No. 6,568,089, which is a continuation-in-part of application No. 29/123,137, filed on May 10, 2000, now abandoned, which is a continuation-in-part of application No. 29/105,953, filed on Jun. 4, 1999, now abandoned.

(51) Int. Cl.$^7$ .............................................. B23D 49/04

(52) U.S. Cl. ............................................ 30/392; 24/50

(58) Field of Search ..................... 30/392–394; 74/50, 74/49

(56) References Cited

U.S. PATENT DOCUMENTS

| | | |
|---|---|---|
| 1,406,071 A | 2/1922 | Pavelka |
| 1,808,228 A | 6/1931 | Hulack et al. |
| 1,816,246 A * | 7/1931 | Bittner |
| 2,337,769 A | 12/1943 | Redenbo |
| 2,435,225 A | 2/1948 | Kolodner et al. |
| 2,436,692 A | 2/1948 | Greene |
| 2,548,411 A | 4/1951 | Vaché |
| 2,619,132 A | 11/1952 | Pierce |
| 2,621,689 A | 12/1952 | Fordon |
| 2,783,790 A | 3/1957 | Keesling |
| 2,793,661 A | 5/1957 | Olson |
| 2,966,931 A | 1/1961 | Dreier |
| 2,984,757 A | 5/1961 | Papworth |
| D194,736 S | 2/1963 | Godfrey et al. |
| 3,156,837 A | 11/1964 | Weller et al. |
| D214,987 S | 8/1969 | Ballone et al. |
| 3,494,391 A | 2/1970 | Mango |
| 3,496,972 A | 2/1970 | Rees |
| 3,547,166 A | 12/1970 | Dudek |
| 3,555,678 A | 1/1971 | Agulnick et al. |
| 3,580,342 A | 5/1971 | Matthews |
| 3,585,719 A | 6/1971 | Kivela |
| 3,757,194 A | 9/1973 | Weber et al. |

(List continued on next page.)

FOREIGN PATENT DOCUMENTS

JP    1-281880 A    11/1989

OTHER PUBLICATIONS

Porter–Cable 1995 Product Catalog, p. 17, description of model No. 647 reciprocating saw.
Porter–Cable Tiger Cub Reciprocating Saw, Model No. 647, parts breakdown.
Alan Phillips, et al., Adjustable Reciprocating Saw, U.S. patent application Ser. No. 10/016,944, filed Dec. 18, 2001.

(List continued on next page.)

Primary Examiner—Douglas D. Watts
(74) Attorney, Agent, or Firm—Hunton & Williams

(57) ABSTRACT

A reciprocating shaft assembly in a reciprocating saw moves in a reciprocal motion and drives a saw blade via a blade holder. At least one bore is formed in an end of the reciprocating shaft assembly opposite the blade holder. A pin fixed to the saw passes through the bore and acts as a bearing to support the reciprocating shaft assembly in its reciprocating motion.

31 Claims, 9 Drawing Sheets

U.S. PATENT DOCUMENTS

| | | | |
|---|---|---|---|
| 3,785,053 A | | 1/1974 | Michaelson |
| 3,802,079 A | | 4/1974 | Ketchpel, Jr. et al. |
| 3,876,015 A | | 4/1975 | Kivela |
| 3,892,158 A | | 7/1975 | Smeets |
| 3,971,132 A | | 7/1976 | Griffies et al. |
| 4,137,632 A | | 2/1979 | Pfanzer |
| 4,272,996 A | * | 6/1981 | Sauerwein ............ 74/50 |
| 4,283,855 A | | 8/1981 | Nalley |
| 4,353,425 A | | 10/1982 | Simpson |
| 4,379,362 A | | 4/1983 | Getts |
| 4,545,123 A | | 10/1985 | Hartmann |
| 4,693,009 A | | 9/1987 | Bone |
| 4,727,941 A | | 3/1988 | Fulton |
| 4,819,334 A | | 4/1989 | Mongeon |
| 5,006,740 A | | 4/1991 | Palm |
| 5,007,172 A | | 4/1991 | Palm |
| D322,921 S | | 1/1992 | Bosten et al. |
| 5,079,844 A | | 1/1992 | Palm |
| 5,083,376 A | | 1/1992 | Lentino |
| 5,165,173 A | | 11/1992 | Miller |
| 5,193,281 A | | 3/1993 | Kasten |
| 5,212,887 A | | 5/1993 | Farmerie |
| 5,398,417 A | | 3/1995 | Quirijnen et al. |
| 5,421,091 A | | 6/1995 | Gerritsen, Jr. |
| 5,575,071 A | | 11/1996 | Phillips et al. |
| 5,596,810 A | | 1/1997 | Neubert et al. |
| 5,755,293 A | | 5/1998 | Bourke |
| 5,832,611 A | | 11/1998 | Schmitz |
| 5,940,977 A | | 8/1999 | Moores, Jr. |
| 6,138,364 A | | 10/2000 | Schmitz |
| 6,212,781 B1 | | 4/2001 | Marinkovich et al. |
| RE37,211 E | | 6/2001 | Bednar et al. |
| 6,263,979 B1 | | 7/2001 | Dyke et al. |
| 6,272,757 B1 | | 8/2001 | Roe |
| D447,924 S | | 9/2001 | Neitzell et al. |
| 6,308,423 B1 | | 10/2001 | Ono |
| D454,476 S | | 3/2002 | Bruno |
| D455,328 S | | 4/2002 | Bruno |
| D475,907 S | | 6/2003 | Neitzell et al. |
| 6,694,625 B1 | | 2/2004 | Wright |
| 2001/0034942 A1 | | 11/2001 | Marinkovich et al. |
| 2002/0178591 A1 | | 12/2002 | Hecht et al. |
| 2003/0009888 A1 | | 1/2003 | Marinkovich et al. |
| 2003/0101600 A1 | | 6/2003 | James et al. |

OTHER PUBLICATIONS

Grizzly Industrial Year 2000 Catalog, Description and Photo of Grizzly 18V Cordless Recipro Saw Kit, Model No. G8599, p. 102, 2000 (no month).

Makita 1999–2000 General Catalog, Description and Photo of Makita Cordless Recipro Saw, Model No. JR180DZ and JR180DWB, p. 12, 1999 (no month).

Milwaukee Electric Tools Catalog 2000, Description and Photo of Milwaukee 18 Volt Power–Plus Sawzall, Model No. 6515–20, p. 20, 2000 (no month).

DeWalt Catalog 2000, Description and Photo of DeWalt Heavy–Duty 24V Reciprocating Saw Kit, Model No. DW008K, p. 10, 2000 (no month).

* cited by examiner

BEARING STRUCTURE FOR A RECIPROCATING SHAFT IN A RECIPROCATING SAW

This application is a divisional of U.S. patent application Ser. No. 09/627,780, filed Jul. 28, 2000 (issued as U.S. Pat. No. 6,568,089), which is a continuation-in-part of U.S. patent application Ser. No. 29/123,137, filed May 10, 2000 (abandoned), which is a continuation-in-part of U.S. patent application Ser. No. 29/105,953, filed Jun. 4, 1999 (abandoned).

BACKGROUND OF THE INVENTION

This invention relates to the field of power tools and in particular to the field of hand-held reciprocating saws.

Reciprocating saws are often used by tradesmen, such as carpenters, plumbers, and electricians for making rough cuts in wood or other hard materials. Manually sawing these materials would be a difficult and time consuming undertaking. Further, many applications require a saw to be used in a confined area where it would be even more difficult to move a saw blade manually back and forth. Consequently, reciprocating saws relieve the user from having to generate the reciprocating action of the saw blade. The motive force in a reciprocating saw is conventionally provided by a motor instead of by the user. The motor typically drives a drive assembly, which in turn reciprocates a saw blade or other tool.

Known reciprocating saws suffer from several drawbacks. In some known reciprocating saws, the motor, drive assembly, reciprocating shaft and blade are each longitudinally aligned along a common axis, creating a tool having a length at least as long as the combined longitudinal length of the motor, drive assembly and reciprocating shaft. This configuration causes the saw to be longer than necessary, which can render impossible, or at best complicate, some cuts to be performed in a limited space. A long saw is also generally awkward to use and unwieldy, and is difficult to store when not in use. Furthermore, the length of the saw can prevent the saw from balancing and standing upright on a flat surface such as a tradesman's scaffolding, a ladder, or a retail shelf.

Furthermore, in some known reciprocating saws, the housing for the saw assembly is unnecessarily complicated and expensive. Openings in the housings of reciprocating saws to facilitate cooling the motor also allow saw dust and other debris to enter into the housing and contaminate the components within the housing. Thus, separately sealed gear box housings are used to enclose some of the working components of the saw, protecting them from debris.

One known arrangement, such as that disclosed in U.S. Pat. No. Re. 35,258, has a separate gear box outside of and attached to the exterior of the housing which surrounds the motor. Having the separate gear box attached to the exterior of the motor housing presents several drawbacks.

First, the exterior surface of the gear box can be expensive to manufacture. For aesthetic and comfort reasons, the external surfaces of the saw are generally smooth and polished. Since, with this design, the exterior surface of the gear box is also an external surface of the saw, at least a portion of the exterior surface is sometimes manufactured to be smooth. Manufacturing a smooth gear box can increase the cost of the saw.

Second, an insulating cover is sometimes required to be fitted around the exterior surface of the gear box in this design. The insulating cover can protect the user from electrical shock if a live electrical wire is cut with the saw. Also, since the gear box can become very hot during prolonged use of the saw, an insulating covering is sometimes necessary to insulate a user's hands from the heat of the gear box. Applying an insulating covering to the gearbox, while potentially eliminating the cost of producing a smooth gear box, is nonetheless still an added expense.

Third, with the design of the '258 patent, the external gear box must be securely attached to the exterior of the motor housing. This can add to the cost of manufacturing the saw.

Furthermore, reciprocating saws create vibration. U.S. Pat. No. Re. 35,258 attempts to address this problem. It discloses a reciprocating saw having a counterbalanced reciprocating mechanism. The counterbalance in the '258 Patent purportedly uses the momentum of a counterbalance to reduce the vibration caused by the combined momentum of a reciprocating shaft and saw blade. While such a configuration may diminish undesirable vibration, it does not provide a configuration as compact and convenient as possible.

These and other drawbacks of known reciprocating saws are overcome by the invention as disclosed herein in conjunction with the preferred embodiments.

SUMMARY OF THE INVENTION

According to one embodiment of the invention, a reciprocating shaft and bearing combination for a reciprocating saw comprises a housing, a first pin fixed to the housing, and a reciprocating shaft assembly having a blade holder at a first end thereof for holding a saw blade. The reciprocating shaft assembly moves in a reciprocating motion relative to the first pin and parallel to an axis of motion. The reciprocating shaft assembly also has at least a first bore formed in a second end thereof opposite the first end, with the axis of the first bore being formed parallel to the axis of motion. A portion of the first pin is positioned inside the first bore such that the first pin supports the reciprocating shaft assembly as a bearing during its reciprocating motion.

DETAILED DESCRIPTION OF THE PREFERRED EMBODIMENTS

Figure 1:
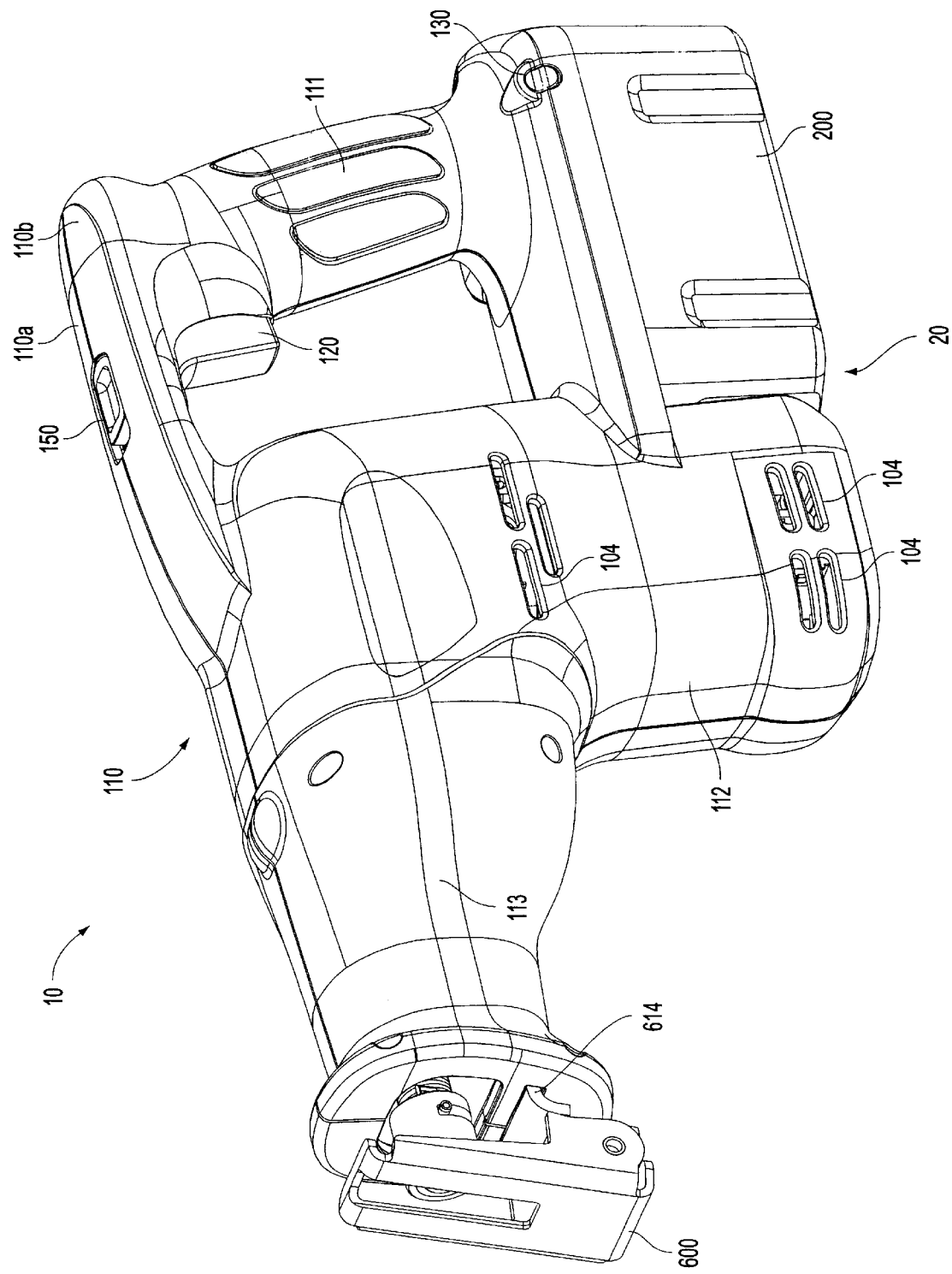
FIG. 1 is a perspective view of a reciprocating saw according to one preferred embodiment of the invention.

The preferred embodiments of the invention pertain to a hand-held reciprocating saw. Although the invention is described in connection with a particularly preferred arrangement of components, various alternative configurations are also possible. Modifications to the preferred embodiments will be readily apparent to those skilled in the art without departing from the spirit and scope of the invention. Thus, the following description of the preferred embodiments are illustrative only. For convenience, similar elements are designated throughout the drawing figures with the same reference numerals.

Figure 2:
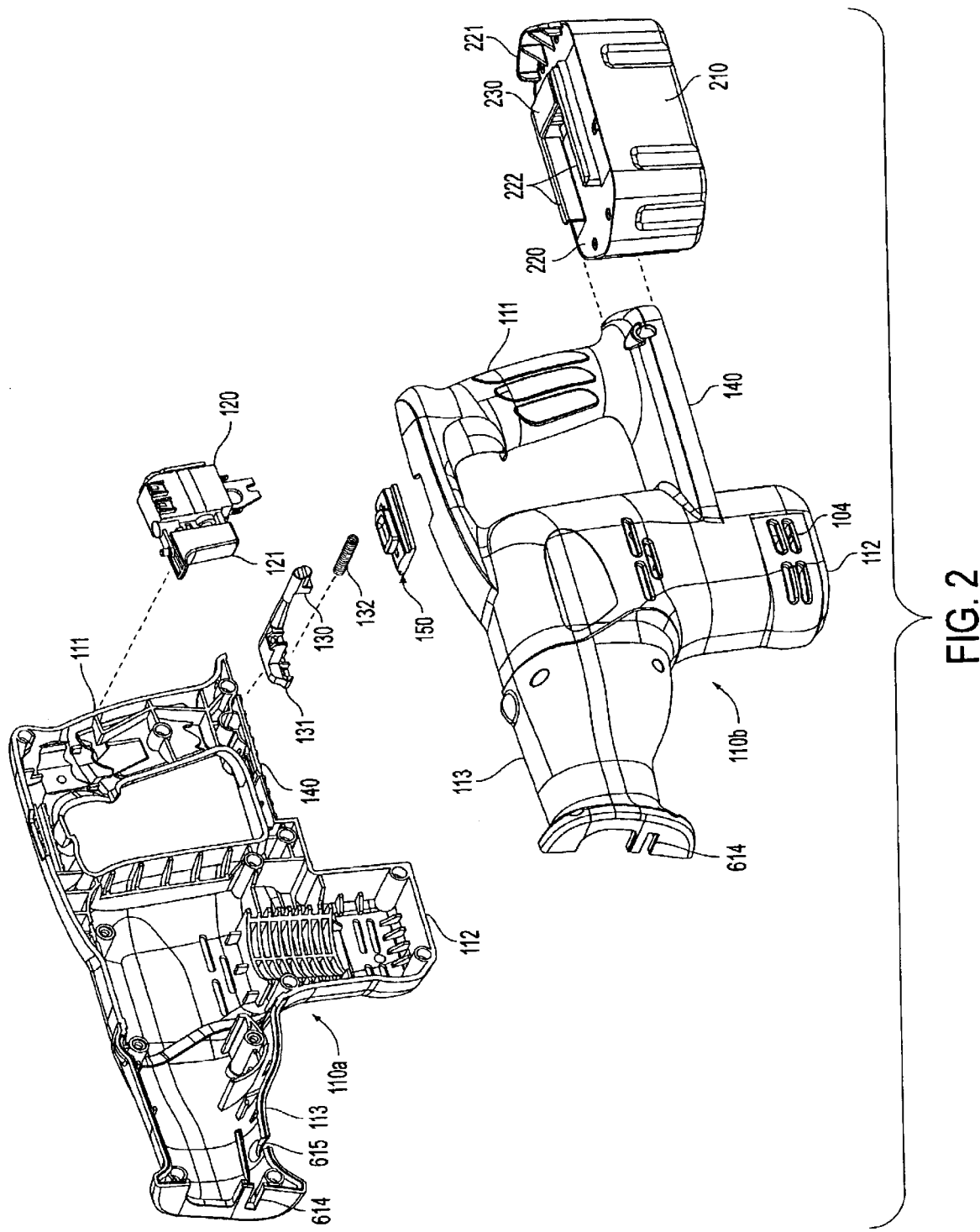
FIG. 2 is an exploded view of the housing assembly of the reciprocating saw of FIG. 1.

With reference to FIGS. 1 and 2, the reciprocating saw 10 includes a two-piece housing 110 comprising two mating clam-shell halves 110a and 110b. The two-piece housing 110 may be injection molded plastic in which each half preferably includes a plurality of matching bosses and bores for receiving fasteners (not shown) which hold together the two mating clam-shell halves 110a and 110b. The two-piece housing 110 also preferably includes a plurality of ribs and supports integrally formed on its internal surfaces for supporting and positioning the various internal components of the reciprocating saw 10 described hereinafter. The two-piece housing 110 includes a handle portion 111, a motor portion 112, and a neck portion 113. In the vicinity of the motor portion 112, air vents 104 allow cooling air to circulate in and out of the two-piece housing 110 for cooling the motor and other internal components.

A switch assembly 120 selectively operates the saw. The switch assembly 120 may be conveniently captured between the two mating clam-shell halves 110a, 110b, and positioned in the vicinity of the handle portion 111. The switch assembly 120 preferably includes an infinitely adjustable potentiometer for infinitely varying the speed of the reciprocating saw 10. A button 121 (see FIG. 2) is selectively depressed to operate the switch assembly.

Lockout assembly 150 prevents the switch assembly from operating the saw when in its locked position. The lockout assembly 150 may be conveniently captured between the two mating clam-shell halves 110a, 110b, and positioned in the vicinity of the handle portion 111. In the preferred embodiment, lockout assembly 150 is a sliding mechanism which, when it is slid into its locked position, physically prevents the button 121 of switch assembly 120 from being moved to the "ON" position to prevent operation of the reciprocating saw 10 and to isolate the motor from the power source.

One preferred embodiment of the invention is a cordless, battery-operated reciprocating saw. However, corded reciprocating saws are also within the scope of the present invention. In the cordless, battery operated reciprocating saw 10, a battery 200 is removably attachable to the two-piece housing 110 and provides power to the reciprocating saw 10. The battery is attachable at a position on the reciprocating saw 10 advantageous to the overall balance of the reciprocating saw 10. A battery lock assembly 130 locks the battery 200 onto the two-piece housing 110 when the battery is slid into its attached position relative to the two-piece housing 110, and includes a button portion 131 (see FIG. 2) which is depressed by a user to release the battery 200 from the two-piece housing 110. A spring 132 biases the battery lock assembly 130 into its battery locking position.

Many systems are known for the releasable attachment of batteries to portable power tools. Any of these known systems may be used with the present invention. In a particularly preferred embodiment, which is the subject of a separate patent application by the assignee, a battery engaging surface 140 is formed beneath the handle portion 111. The engaging surface 140 includes battery terminals (not shown), which are adapted to engage battery posts 230 on the battery 200. The engaging surface 140 also includes shoulders (not shown) for receiving flanges 222 of battery 200.

The battery 200 includes a tub-shaped bottom 210 and a lid 220. Battery cells (not shown) are positioned in the tub-shaped bottom 210 and the lid 220 is secured thereto. The lid 220 has a curved heel cup 221 at the rear end thereof. The pair of parallel flanges 222 extend above the top surface of the lid 220. The battery posts 230 are positioned between the flanges 222.

To engage the battery 200 with the two-piece housing 110, the flanges 222 are positioned parallel with and adjacent the opening of the shoulders (not shown) of the engaging surface 140. The battery 200 is slid in a direction parallel with the flanges 222 and the flanges 222 are received by the shoulders of the engaging surface 140. Eventually, the battery 200 reaches the limit of its sliding movement and abuts against the two-piece housing 110, while the battery lock assembly 130 moves into its battery locking position and locks battery 200 onto the two-piece housing 110.

The reciprocating saw 10 includes a base 20 connected to the two-piece housing for providing a surface for the reciprocating saw 10 to rest upon. In a preferred embodiment, the base 20 is integrally formed with a surface of the motor portion 112 of the two-piece housing 110 and the tub-shaped bottom 210 of the battery 200. Preferably, these two surface are substantially coplanar and flat, or at a minimum provide three points of contact for engagement with a surface. However, the base 20 may be formed by some portion of the two-piece housing 110 alone, or may be formed by the battery 200 alone. Or, the base 20 may be formed by some other cooperation of the battery 200 with another portion of the two-piece housing 110. All of these alternative arrangements for the base 20 are within the scope of the present invention. The base 20 may be formed from any surface of the reciprocating saw 10, so long as the base 20 provides a surface for the reciprocating saw 10 to rest upon.

The overall arrangement of components of the reciprocating saw 10 has been chosen so that the center of gravity of the reciprocating saw 10 is at a point where a line intersecting the center of gravity and perpendicular to a surface upon which the base of the reciprocating saw 10 is resting would intersect the base 20. Having the center of gravity of the reciprocating saw 10 at such a point relative to the base 20 means that any force less than a predetermined force applied to the reciprocating saw 10 when it is resting on base 20 will not cause the reciprocating saw to tip or roll relative to the surface upon which it is resting. Thus, the reciprocating saw 10 is capable of upright standing without the use of external supports.

One of the important features of the preferred embodiments for both retail and functional reasons is the ability of the reciprocating saw 10 to stand upright independently, i.e., without any external supports. In the retail context, by standing upright independently, retailers may display the tool in its most desirable upright orientation without the need of external fixtures.

Functionally, the ability to stand upright independently protects the saw blade and the surface on which the saw is resting from damage. Known reciprocating saws are not capable of upright standing. Unless placed very carefully, when the saw is placed on a surface after use, the saw may tip and roll until it reaches a final resting position. In these situations, the saw blade may strike the surface before the saw comes to rest, causing the saw blade to be dulled or bent, or worse yet, damaging the surface upon which the saw has been placed. However, with the present embodiment, the user can be confident that the surface upon which he is placing the reciprocating saw 10 will not be marred by the saw blade because the saw stands upright independently.

Also, the user can more easily retrieve the reciprocating saw 10 when it is resting in an upright standing position because the handle portion 111 is also in an upright position and can be easily accessed. An upright position of the handle portion is a position where, when the handle portion is grasped by the user, the flat top and bottom surfaces of the user's hand are generally parallel with the longitudinal axis of the user's body. With the handle portion 111 in an upright position, the user can easily grasp the handle portion 111 without twisting his or her wrist into position for grasping the handle portion 111.

Preferred embodiments of the drive assembly and other components of reciprocating saw 10 will now be described with reference to FIGS. 3–9. This drive assembly is only one of many suitable mechanisms for driving a reciprocating shaft from a motor, and other mechanisms may be substituted without departing from the scope of the present invention.

Figure 3:
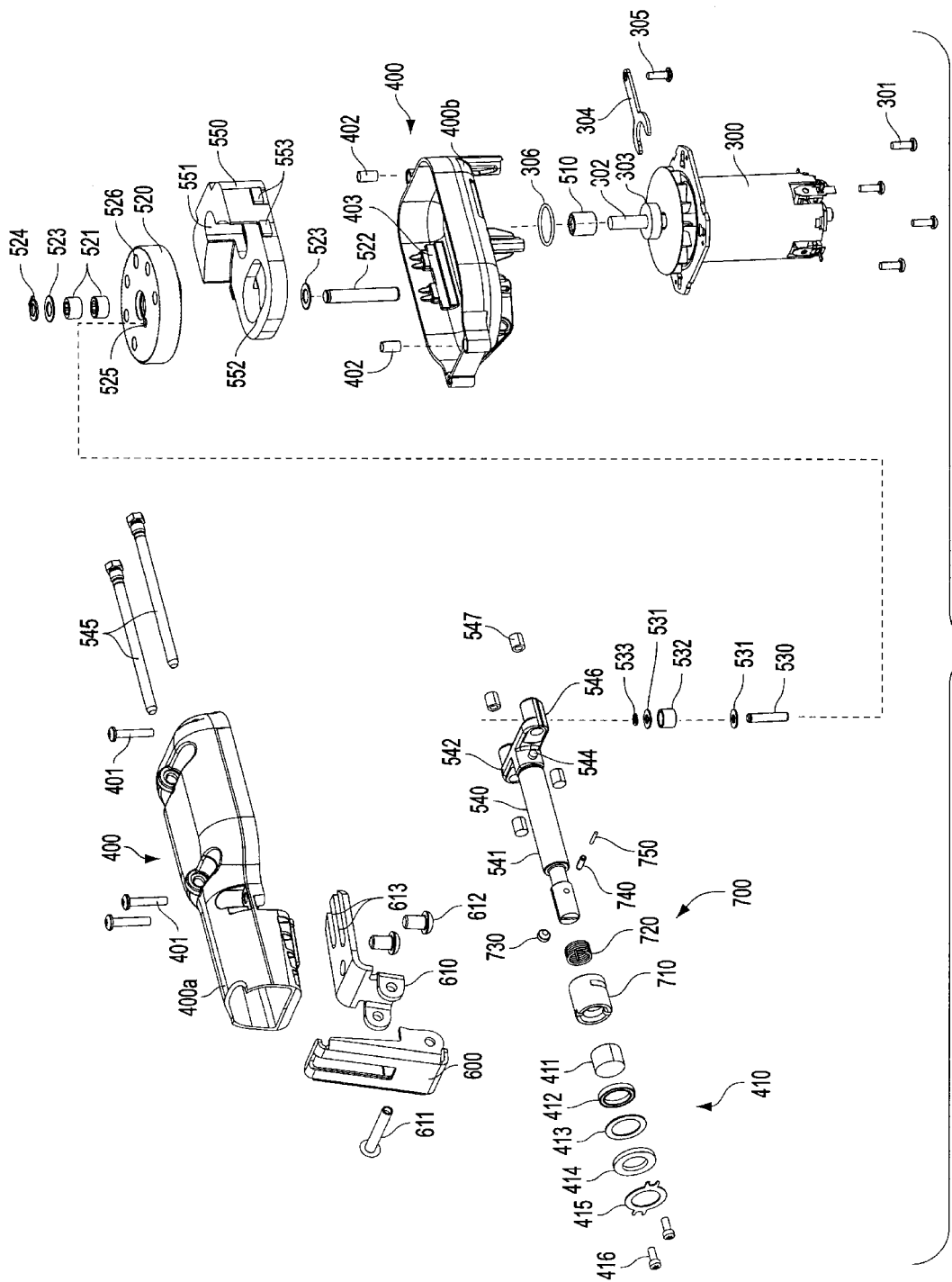
FIG. 3 is an exploded view showing many of the internal components of the reciprocating saw of FIG. 1.

With reference to FIG. 3, a motor 300 is arranged inside the two-piece housing 110 with the rotational axis of the motor 300 arranged at an angle with respect to the longitudinal axis of the reciprocating shaft assembly 540. Preferably, the rotational axis of the motor 300 is arranged at a generally ninety degree angle with respect to the longitudinal axis of the reciprocating shaft assembly 540. This configuration reduces the overall length of the reciprocating saw 10 so that the saw is easier to manipulate than known saws where the motor is parallel with the output shaft. With the motor 300 placed in this configuration inside of the two-piece housing 110, more of the weight of the saw is placed in a region above the base 20, making the saw more stable when resting on its base 20.

Many of the drive assembly components of the reciprocating saw 10 are protectively enclosed in a sealed drive housing 400. The drive housing 400 comprises upper housing 400a and lower housing 400b which mate together and are attached with fasteners 401 and sleeves 402. The upper housing 400a and the lower housing 400b together form a sealed interior chamber. This provides for the proper lubrication of the drive assembly parts as well as minimizes debris from reaching the drive assembly where it would tend to wear the drive assembly parts.

The drive housing 400 is itself enclosed by the two-piece housing 110. None of the exterior surfaces of the drive housing 400 forms an external surface of the reciprocating saw 10. Therefore, the drive housing 400 is somewhat less expensive to manufacture because the exterior surfaces of drive housing 400 do not need to be smooth or polished. Nearly all of the external surfaces of reciprocating saw 10 are part of the two-piece housing 110. Since the two-piece housing 110 is preferably an injection molded plastic component, nearly all of the external surfaces of reciprocating saw 10 are electrically and thermally insulated. Also, the connection between the drive housing 400 and the reciprocating saw 10 is accomplished cost effectively using internal ribs on the two-piece housing 110.

Motor 300 is attached to the lower housing 400b by fasteners 301. Motor shaft 302 extends into the lower housing 400b and is supported by bearing 303 which is fit into a bore in the exterior of the lower housing 400b. An O-ring 306 is positioned between the bearing 303 and the lower housing 400b to prevent the outer race of bearing 303 from spinning. Bearing retainer 304 is affixed to lower housing 400b by fastener 305 and holds bearing 303 in place in the bore on the exterior of the lower housing 400b.

Pinion 510 is connected to the end of motor shaft 302. Pinion 510 drives crank gear 520. Crank gear 520 is supported for rotational movement inside of the drive housing 400 on bearings 521, which are in turn mounted on shaft 522. Thrust washers 523 are also arranged on either side of bearings 521 around shaft 522, and retaining ring 524 holds bearings 521 and thrust washers 523 in place axially on shaft 522.

Eccentric crank pin 530 is eccentrically mounted to crank gear 520 at bore 525. Eccentric crank pin 530 supports crank bearing 532. Crank bearing 532 is mounted to the eccentric crank pin 530 surrounded by washers 531, and held in place axially on eccentric crank pin 530 by retaining ring 533.

Figure 4:
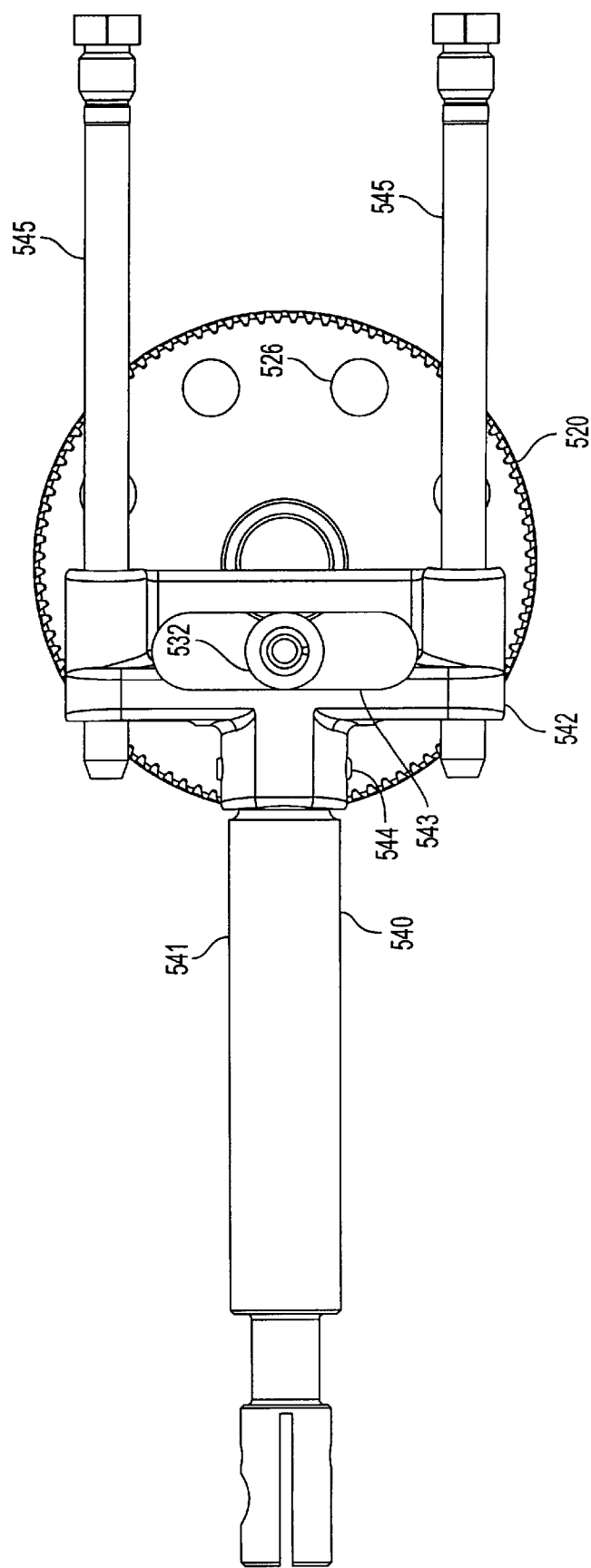
FIG. 4 is a top view of the reciprocating shaft assembly and other related components of FIG. 3.

With reference to FIGS. 3 and 4, reciprocating shaft assembly 540 includes a reciprocating shaft 541 connected by pin 544 to a T-shaped head 542. Slot 543 is formed in the T-shaped head 542 and crank bearing 532 is adapted to be received inside of slot 543. As the crank gear 520 rotates, the rotation will cause eccentric crank pin 530 and crank bearing 532 to rotate about the same axis as crank gear 520. The axis of rotation of the crank gear 520 is offset from the central axis of crank bearing 532. The rotational movement of crank bearing 532 about the offset axis can be divided into two orthogonal components, a forward and backward component aligned with the longitudinal axis of the reciprocating shaft 541, and a left and right component perpendicular to the longitudinal axis of the reciprocating shaft 541. The forward and backward component of movement of the crank bearing 532 will cause the reciprocating shaft assembly 540 to reciprocate back and forth. The left and right component of movement of the crank bearing 532 will not cause any movement of the reciprocating shaft assembly 540 as the crank bearing 532 will simply move left and right inside of slot 543. This type of mechanism for converting rotary motion into transverse motion is sometimes called a Scotch yoke.

Figure 8:
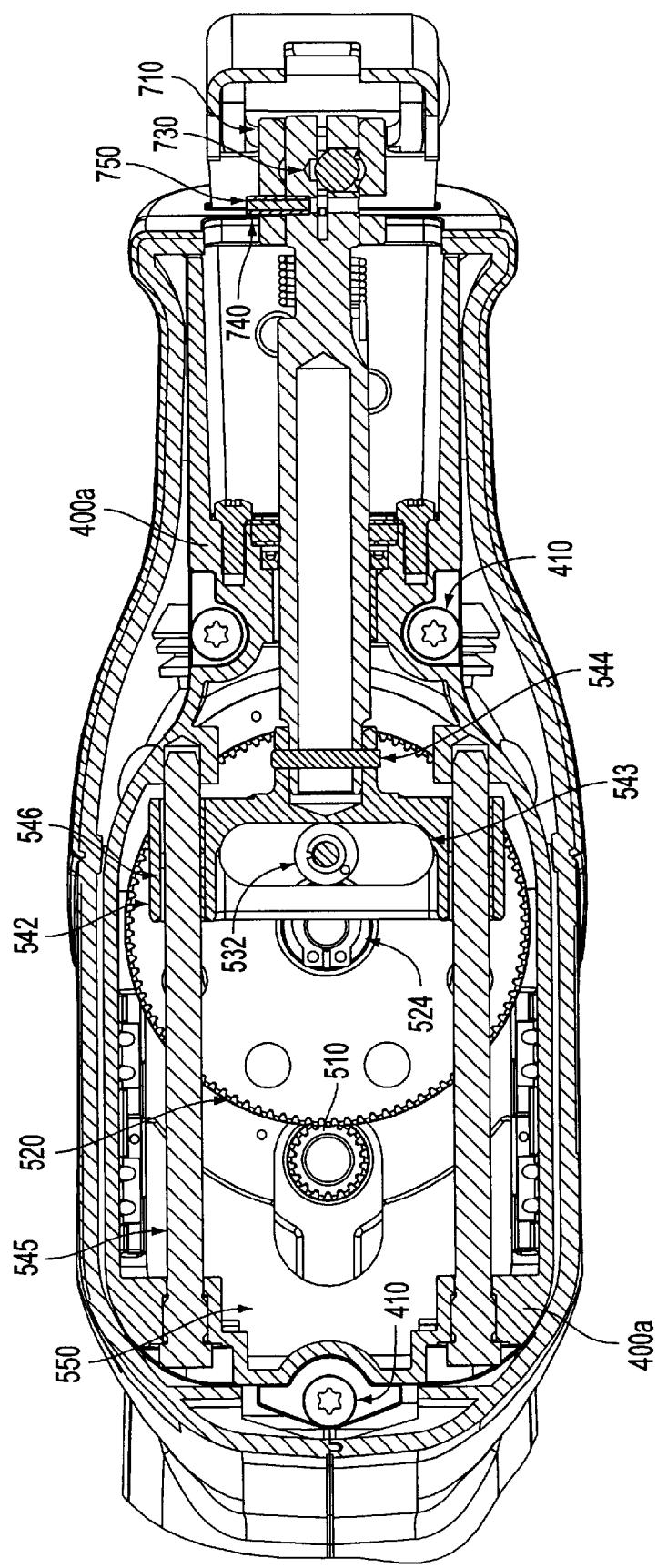
FIG. 8 is a sectional view taken from section B—B of FIG. 7.

Yoke pins 545 are fixed in a parallel relationship and secured to the inside of upper housing 400a (see FIG. 8). T-shaped head 542 of the reciprocating shaft assembly 540 also includes two parallel bores 546 which receive the yoke bearings 547 (see FIG. 3) and yoke pins 545. Yoke pins 545 help guide the reciprocating movement of reciprocating shaft assembly 540.

Figure 5:
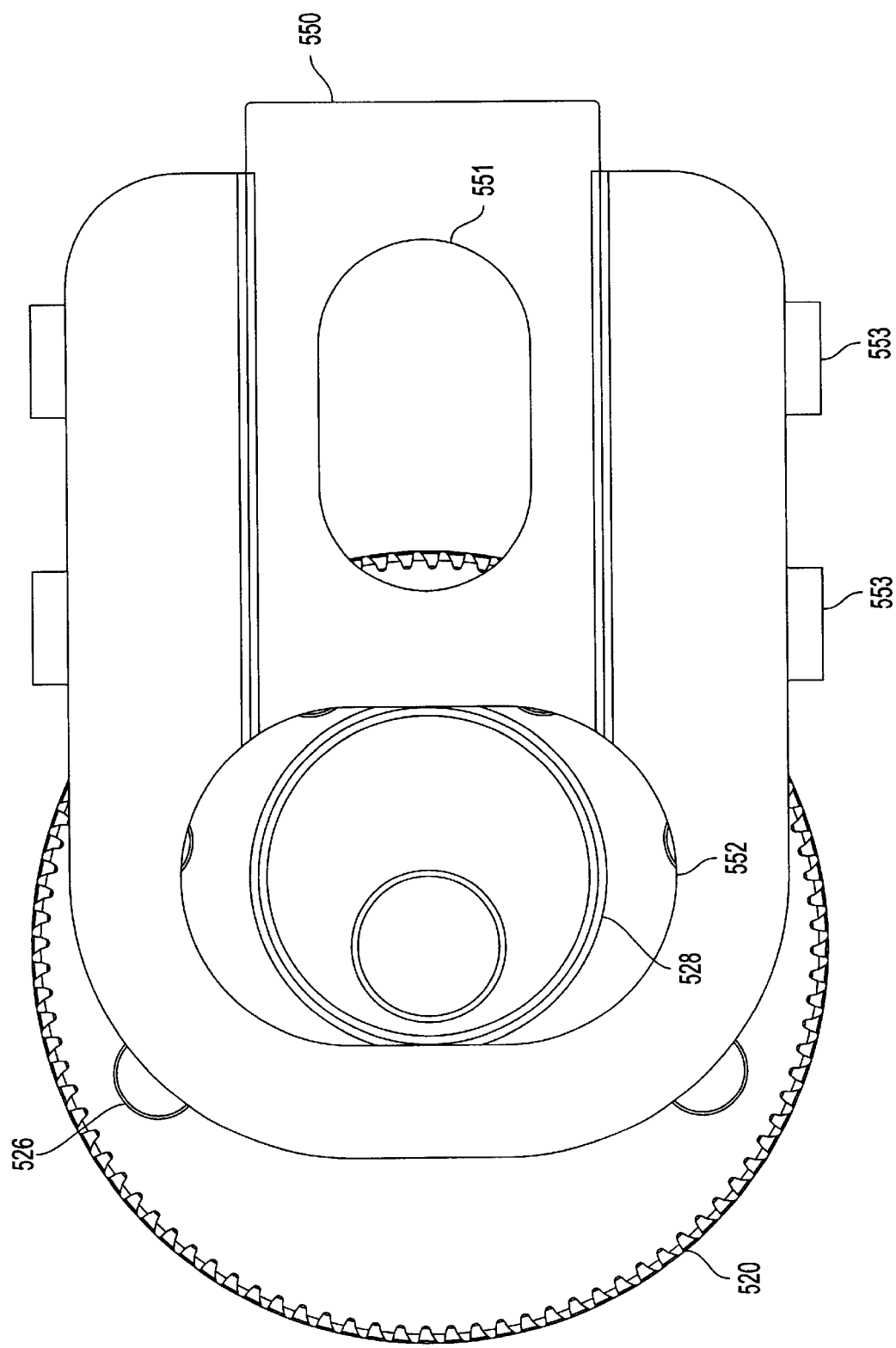
FIG. 5 is a bottom view of the counterweight and other related components of FIG. 3.
Figure 6:
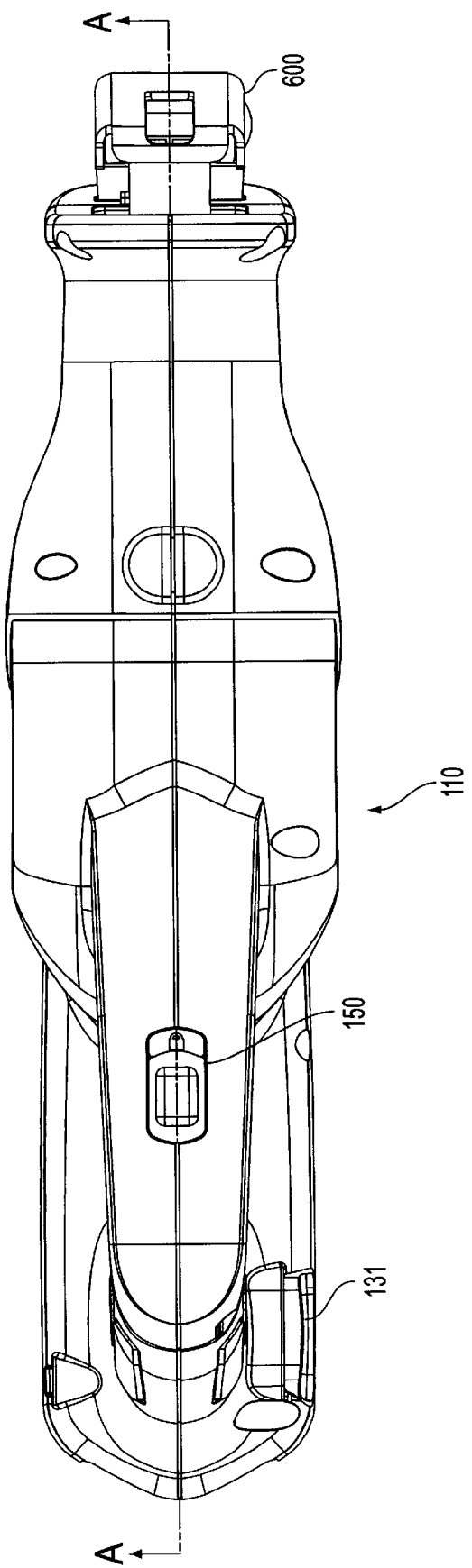
FIG. 6 is a top view of the reciprocating saw of FIG. 1.
Figure 7:
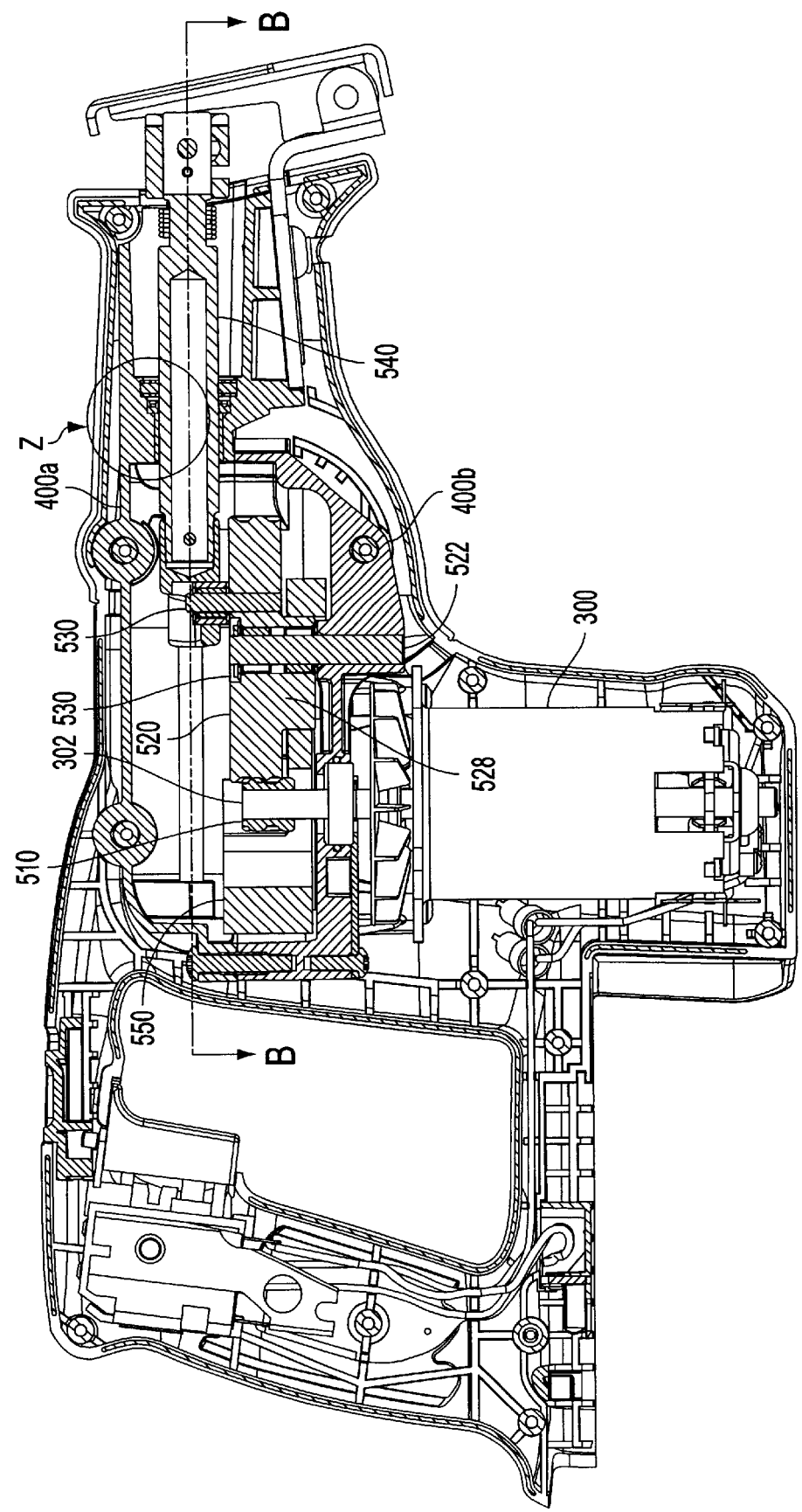
FIG. 7 is a sectional view taken from section A—A of FIG. 6.

With reference to FIGS. 3 and 5, in a preferred embodiment a counterweight 550 is also included inside of drive housing 400. Counterweight 550 includes a first slot 551 adapted to allow motor shaft 302 and pinion 510 to pass through counterweight 550 and to allow pinion 510 to be in position to drive crank gear 520. Crank gear 520 also includes an eccentric shaft 528. Eccentric shaft 528 is preferably a raised cylindrical portion integrally formed on and extending from one side (the underside in the illustrated embodiment) of crank gear 520, with the axis of the cylindrical portion parallel with and offset from the rotational axis of crank gear 520. Eccentric shaft 528 is received within a second slot 552 of counterweight 550. Similar to the previously described Scotch yoke mechanism which drives the reciprocating shaft assembly 540, the eccentric shaft 528 drives the counterweight 550 in a reciprocating, back and forth motion. Counterweight 550 is supported for this reciprocating motion by slides 553, which ride inside slots 403 formed in lower housing 400b of drive housing 400.

The weight of the reciprocating shaft assembly 540 and its high-speed reciprocating motion can cause significant vibration of the reciprocating saw 10 when in use. The reciprocating movement of counterweight 550 helps to reduce this vibration. Eccentric shaft 528 is formed on crank gear 520 in a position relative to crank pin 530 so that the direction of the reciprocating motion of counterweight 550 will at each instant be opposite the direction of the reciprocating motion of the reciprocating shaft assembly 540.

The illustrated design of counterweight 550 and its placement inside of drive housing 400 result in an advantageous compact arrangement. For example, counterweight 550 includes at least one radial surface 551 which has a radius of curvature substantially the same as the radius of curvature of crank gear 520. Radial surface 551 allows counterweight 550 to be positioned closely adjacent to crank gear 551.

With crank pin 530, crank bearing 532, and eccentric shaft 528 all eccentrically mounted on crank gear 520, crank gear 520 is not, without further provision, dynamically balanced about its own rotational axis. Balancing holes 526 are therefore formed in crank gear 520 in order to dynamically balance crank gear 520 for smooth rotation about its rotational axis.

Figure 9:
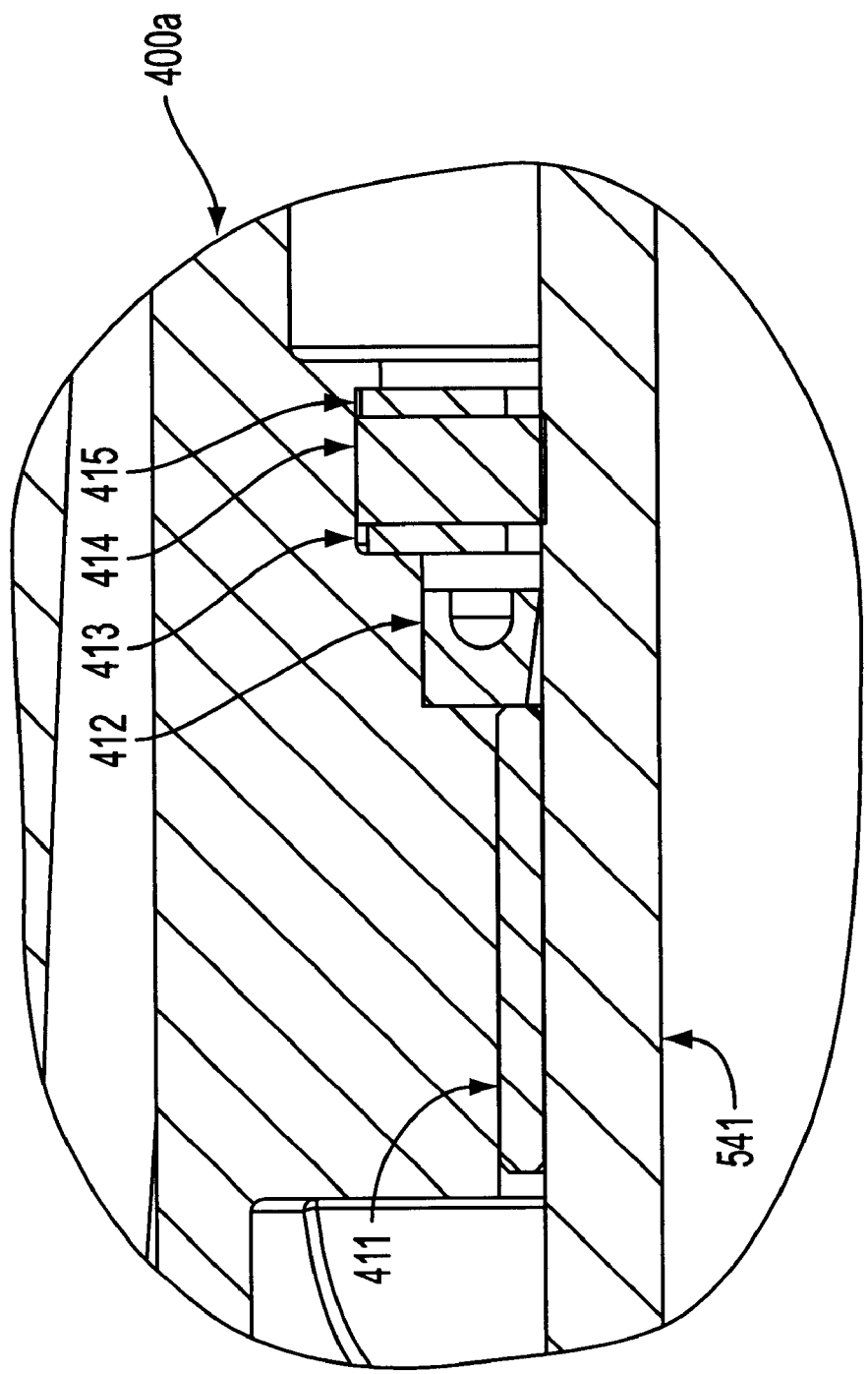
FIG. 9 is a detail of region Z indicated in FIG. 7.

With reference to FIGS. 3 and 9, seal assembly 410 is positioned between the reciprocating shaft 541 of the reciprocating shaft assembly 540 and the upper housing 400a of the drive housing 400. Seal assembly 410 both prevents debris from entering drive housing 400 where it would cause wear to the working parts, and prevents the lubricating agents located inside of drive housing 400 from escaping. Seal assembly 410 may be any type of seal known in the art for this purpose. In a preferred embodiment, a shaft bearing 411 is positioned at a base of the seal assembly 410. A rubber seal 412 abuts shaft bearing 411. Washer 413 separates rubber seal 412 from felt seal 414. Plate 415 supports felt seal 414 on the opposite side of washer 413 and is adapted to receive fasteners 416. Fasteners 416 secure the seal assembly 410 to the upper housing 400a against the reciprocating motion of reciprocating shaft 541.

A tool clamp 700 is provided on an end of reciprocating shaft 541 of reciprocating shaft assembly 540. Tool clamp 700 is adapted to hold a working tool onto reciprocating shaft 541 so that the reciprocating shaft 541 will drive the working tool with its reciprocating motion. Tool clamp 700 may be any of a number of mechanisms known in the art.

In a preferred embodiment, tool clamp 700 is a keyless blade clamp including an eccentric collar 710, torsion spring 720, roll pin 740, wire 750, and pin clamp 730. This general type of tool clamp is more fully described in U.S. Pat. No. 5,575,071, the disclosure of which is hereby incorporated by reference. Briefly, the end of shaft 541 is formed with an axial slot wide enough to accept a saw blade. A through-hole is formed perpendicular to the slot and extends from the slot to the exterior of shaft 541. Pin clamp 730 is inserted into and through the hole. Eccentric collar 710 includes an eccentric slot which cams against one end of pin clamp 730.

The keyless blade clamp has two positions. In one position, eccentric collar 710 will hold pin clamp 730 in a position where pin clamp 730 extends into the axial slot formed on shaft 741. A saw blade positioned in the slot will include a hole which accepts the other end of pin clamp 730. In this position, the saw blade is held in the slot because pin clamp 730 will partially pass through the hole in the saw blade. If the eccentric collar 710 is rotated to a second position, then the eccentric slot formed in the collar will no longer cam against pin clamp 730 inside of the hole in the saw blade, and the saw blade may then be removed in this second position. Torsion spring 720 biases eccentric collar 710 to the first position. Roll pin 740 engages with another slot formed in eccentric collar 710 and prevents the eccentric collar 710 from over-rotating and holds it in place axially on shaft 541. Wire 750 is forced inside of a hole in roll pin 740 to create an interference fit with roll pin 740 and shaft 541 when roll pin 740 is positioned in a hole in the end of shaft 740.

In a preferred embodiment, a shoe 600 is provided for helping to support and position the reciprocating saw 10 relative to a work-piece during use. The shoe 600 is pivotally attached to a shoe bracket 610 by rivet 611. Fasteners 612 engage shoe bracket 610 at slots 613 and attach to upper housing 400a of drive housing 400. With fasteners 612 engaging shoe bracket 610 at slots 613, the position of the shoe bracket 610 and the shoe 600 relative to the upper housing 400a may be adjusted by loosening fasteners 612, sliding shoe bracket 610 along slots 613, and re-tightening fasteners 612 to upper housing 400a. A slot 614 (see FIGS. 1 and 2) is formed in the two-piece housing 110 to permit shoe bracket 610 to extend outwardly from the saw. Access holes 615 formed in the two-piece housing 110 permit access for a tool to loosen and re-tighten fasteners 612.

With the above described construction, reciprocating saw 10 is capable of independent, upright standing. The handle is easy to access when the reciprocating saw 10 is in its upright standing position so that the reciprocating saw 10 is easy to retrieve. The housing of reciprocating saw 10 is aesthetically and functionally pleasing and can be simply manufactured. Many of the drive assembly components are sealed in a drive housing for longer-life operation. Finally, reciprocating saw 10 is compact, battery powered, and includes a counterweight for reducing vibration during use.

Additional advantages and modifications will readily occur to those skilled in the art, and those modifications are within the scope of the claimed invention. The invention in its broader aspects is not limited to the specific details in representative embodiments shown and described herein. Accordingly, various modifications may be made without departing from the spirit and scope of the general inventive concepts of the invention, which are defined by the appended claims.

We claim:

1. A reciprocating shaft and bearing combination for a reciprocating saw comprising:

a housing;

a first pin fixed to the housing;

a reciprocating shaft assembly having a blade holder at a first end thereof for holding a saw blade, the reciprocating shaft assembly moving in a reciprocating motion relative to the first pin and parallel to an axis of motion;

the reciprocating shaft assembly also having at least a first bore formed in a second end thereof opposite the first end, the axis of the first bore being formed parallel to the axis of motion and a portion of the first pin being positioned inside the first bore;

a shaft bearing fixed to the housing, the shaft bearing surrounding a portion of the reciprocating shaft assembly intermediate the first end and the second end of the reciprocating shaft assembly; and wherein the first pin supports the reciprocating shaft assembly as a bearing during its reciprocating motion.

2. The reciprocating shaft and bearing combination of claim 1 wherein:

the first pin has first and second distal ends, each of the first and second distal ends is fixed to the housing; and the first bore is a through bore and a portion of the first pin between its first and second distal ends passes through the first bore.

3. The reciprocating shaft and bearing combination of claim 1 further comprising:

a second pin fixed to the housing;

a second bore formed in the second end of the reciprocating shaft assembly, the axis of the second bore being formed parallel to the axis of motion and a portion of the second pin being positioned inside the second bore;

wherein the second pin supports the reciprocating shaft assembly as a bearing during its reciprocating motion.

4. The reciprocating shaft and bearing combination of claim 3 wherein:

the first pin has first and second distal ends, each of the first and second distal ends is fixed to the housing;

the second pin has first and second distal ends, each of the first and second distal ends is fixed to the housing;

the first bore is a through bore and a portion of the first pin between its first and second distal ends passes through the first bore; and the second bore is a through bore and a portion of the second pin between its first and second distal ends passes through the second bore.

5. A reciprocating shaft and bearing combination for a reciprocating saw comprising:

a housing;

a first pin fixed to the housing;

a reciprocating shaft assembly having a blade holder at a first end thereof for holding a saw blade, the reciprocating shaft assembly moving in a reciprocating motion relative to the first pin and parallel to an axis of motion;

the reciprocating shaft assembly also having at least a first bore formed in a second end thereof opposite the first end, the axis of the first bore being formed parallel to the axis of motion and a portion of the first pin being positioned inside the first bore;

wherein the first pin supports the reciprocating shaft assembly as a bearing during its reciprocating motion;

a main body housing at least partially enclosing the housing, the main body housing including a handle portion, the housing being supported inside of the main body housing; and wherein the housing encloses and seals a portion of the reciprocating shaft assembly having the first bore, a portion of the reciprocating shaft assembly moving in and out of the housing during the reciprocating motion.

6. A drive assembly for a reciprocating saw, the reciprocating saw comprising a housing having a handle portion and a neck portion, a rotary motor, and a switch on the handle portion for controlling the rotary motor, wherein the drive assembly converts rotary motion of the rotary motor into reciprocating motion, the drive assembly comprising:

a reciprocating shaft assembly having a blade holder at a front portion thereof for holding a saw blade, an elongated slot at a rear portion thereof, and a mid portion between the front portion and the rear portion, the reciprocating shaft assembly moving in a reciprocating motion to permit the saw blade to cut a workpiece;

a crank gear with an eccentric crank mounted thereon, the eccentric crank received in the elongated slot, the eccentric crank moving the reciprocating shaft assembly reciprocally forwards and backwards in its reciprocating motion as the crank gear rotates, and moving reciprocally from a left side of the elongated slot to an opposite right side;

a front shaft bearing surrounding the mid portion of the reciprocating shaft assembly;

a first rear bearing mounted on the reciprocating shaft assembly on the left side of the lateral slot; and a second rear bearing mounted on the reciprocating shaft assembly on the right side of the lateral slot.

7. The drive assembly for a reciprocating saw according to claim 6 further comprising:

a drive housing wherein the crank gear and the front shaft bearing are mounted to the drive housing.

8. The drive assembly for a reciprocating saw according to claim 7 wherein:

the drive housing fully encloses at least the crank gear and seals grease inside of the drive housing for lubricating the crank gear against outside contamination.

9. The drive assembly for a reciprocating saw according to claim 8 wherein the drive housing is at least partially enclosed by the housing.

10. The drive assembly for a reciprocating saw according to claim 7 wherein the drive housing is at least partially enclosed by the housing.

11. The drive assembly for a reciprocating saw according to claim 10 wherein internal ribs formed on the housing help position and retain at least a part of the drive housing inside of the housing.

12. The drive assembly for a reciprocating saw according to claim 10 further comprising:

a counterweight which reciprocates forwards and backwards in a manner opposite the reciprocating shaft assembly to balance vibrations of the reciprocating shaft assembly.

13. The drive assembly for a reciprocating saw according to claim 12 wherein the counterweight is driven in its forwards and backwards reciprocating motion by an eccentric surface of the crank gear.

14. The drive assembly for a reciprocating saw according to claim 13 further comprising:

a bore formed in the drive housing; and wherein the rotary motor has a motor shaft, the motor shaft passing through the bore.

15. The drive assembly for a reciprocating saw according to claim 14 wherein the rotary motor has a lower bearing disposed on a first end of the motor shaft and an upper bearing disposed on a second end of the motor shaft opposite the first end, the upper bearing mounted in the bore and supporting the rotation of the motor shaft.

16. The drive assembly for a reciprocating saw according to claim 15 further comprising:

a pinion gear mounted on the motor shaft, the pinion gear driving the crank gear.

17. The drive assembly for a reciprocating saw according to claim 16 wherein the pinion gear passes through an opening in the counterweight.

18. The drive assembly for a reciprocating saw according to claim 17 wherein the crank gear is positioned between the pinion gear and the blade holder.

19. The drive assembly for a reciprocating saw according to claim 18 wherein the rotary motor rotates about an axis parallel to the rotational axis of the crank gear.

20. The drive assembly for a reciprocating saw according to claim 10 further comprising:

a bore formed in the drive housing; and wherein the rotary motor has a motor shaft, the motor shaft passing through the bore.

21. The drive assembly for a reciprocating saw according to claim 20 wherein the rotary motor rotates about an axis parallel to the rotational axis of the crank gear.

22. The drive assembly for a reciprocating saw according to claim 20 wherein the rotary motor has a lower bearing disposed on a first end of the motor shaft and an upper bearing disposed on a second end of the motor shaft opposite the first end, the upper bearing mounted in the bore and supporting the rotation of the motor shaft.

23. The drive assembly for a reciprocating saw according to claim 22 wherein the rotary motor rotates about an axis parallel to the rotational axis of the crank gear.

24. The drive assembly for a reciprocating saw according to claim 20 further comprising:

a pinion gear mounted on the motor shaft, the pinion gear driving the crank gear.

25. The drive assembly for a reciprocating saw according to claim 24 wherein the rotary motor rotates about an axis parallel to the rotational axis of the crank gear.

26. The drive assembly for a reciprocating saw according to claim 24 wherein the crank gear is positioned between the pinion gear and the blade holder.

27. The drive assembly for a reciprocating saw according to claim 26 wherein the rotary motor rotates about an axis parallel to the rotational axis of the crank gear.

28. The drive assembly for a reciprocating saw according to claim 24 wherein the first rear bearing and the second rear bearing each comprise a bearing sleeve adapted to engage a pin having a longitudinal axis parallel to the reciprocating motion axis.

29. The drive assembly for a reciprocating saw according to claim 6 wherein the first rear bearing and the second rear bearing each comprise a bearing sleeve adapted to engage a pin having a longitudinal axis parallel to the reciprocating motion axis.

30. A drive assembly for a reciprocating saw, the reciprocating saw comprising a housing having a handle portion, a rotary motor, and a switch on the handle portion for controlling the rotary motor, wherein the drive assembly converts rotary motion of the rotary motor into reciprocating motion, the drive assembly comprising:

a reciprocating shaft assembly having a blade holder at a front portion thereof for holding a saw blade, an elongated slot at a rear portion thereof, and a mid portion between the front portion and the rear portion, the reciprocating shaft assembly moving in a reciprocating motion parallel to an axis of motion to permit the saw blade to cut a workpiece;

a crank gear with an eccentric crank mounted thereon, the eccentric crank received in the elongated slot, the eccentric crank moving the reciprocating shaft assembly reciprocally forwards and backwards in its reciprocating motion as the crank gear rotates, and moving reciprocally from a left side of the elongated slot to an opposite right side;

a front shaft bearing surrounding the mid portion of the reciprocating shaft assembly;

a first pin; and at least a first bore formed in the rear portion of the reciprocating shaft assembly, the axis of the first bore being formed parallel to the axis of motion and a portion of the first pin being positioned inside the first bore.

31. The drive assembly for a reciprocating saw according to claim 30 further comprising:

a drive housing;

wherein the front shaft bearing is mounted on the housing;

wherein the first pin has first and second distal ends and each of the first and second distal ends is mounted to the drive housing; and the first bore is a through bore and a portion of the first pin between its first and second distal ends passes through the first bore.

* * * * *